Aug. 12, 1941. LE ROY N. HERMANN Re. 21,873

THERMOSTATICALLY CONTROLLED FAUCET UNIT

Original Filed May 26, 1934 2 Sheets-Sheet 1

Inventor

LeRoy N. Hermann

By Watson E. Coleman

Attorney

Aug. 12, 1941. LE ROY N. HERMANN Re. 21,873
THERMOSTATICALLY CONTROLLED FAUCET UNIT
Original Filed May 26, 1934 2 Sheets-Sheet 2
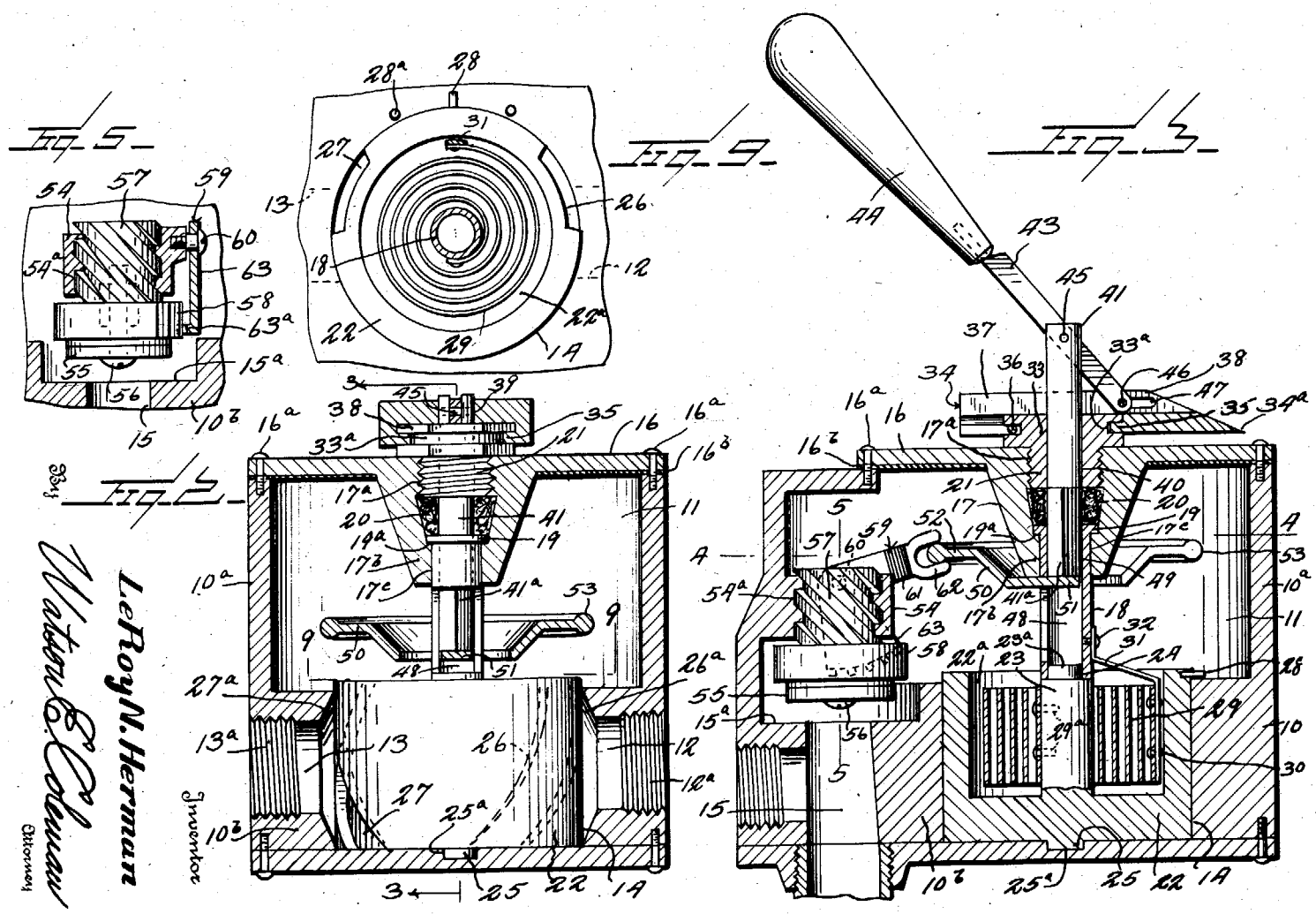
Inventor
LeRoy N. Herman
By Watson E. Coleman
Attorney Reissued Aug. 12, 1941 Re. 21,873

UNITED STATES PATENT OFFICE 21,873

THERMOSTATICALLY CONTROLLED FAUCET UNIT

Le Roy N. Hermann, Chicago, Ill.

Original No. 2,132,689, dated October 11, 1938, Serial No. 727,791, May 26, 1934. Application for reissue October 3, 1940, Serial No. 359,588

9 Claims. (Cl. 236—12)

My invention relates generally to improvements in faucets and more particularly to a water mixing and temperature regulating faucet or valve.

The main object is to provide a faucet for use in connection with separate sources of hot and cold water and adapted to automatically mix and dispense the water from these sources at any predetermined temperature, and to regulate the flow of the water at this desired temperature.

Another object is to provide a faucet of this kind in a simple, practical, unitary form having a single handle adapted to control both the temperature of the emitted water and its rate of flow, each action being entirely independent of the other and accomplished by rotation of the handle in one case and lifting the handle in the other.

Another object is to provide a faucet including a casing having a mixing chamber and hot and cold water inlets, a proportioning valve controlling the flow of water from the inlets to the mixing chamber, thermostatic means for controlling the operation of the valve, a handle for adjusting the thermostatic means to operate at different indicated temperatures, an outlet valve for dispensing the mixed water in the mixing chamber, and means on the same handle for controlling the flow of water through the outlet valve independently of the setting of the temperature regulating elements.

With these and other objects in view, the invention resides in the novel construction and arrangement of parts as hereinafter set forth and claimed, reference being had to the accompanying drawings, wherein:

Figure 2 is a vertical cross section through the faucet;

Figure 3 is a vertical cross section along the line 3—3 of Figure 2, but showing the handle lifted;

Figure 5 is a detached detail view of the outlet valve and its associated operating means;

Figure 9 is an enlarged horizontal section along the line 9—9 of Figure 2;

Figure 4:
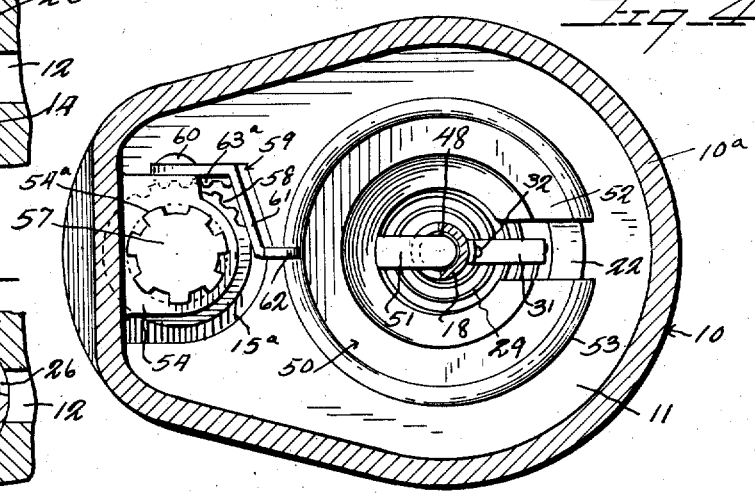
Figure 4 is a horizontal section along the line 4—4 of Figure 3.

Referring now with more particularity to the drawings, my invention comprises a casing 10 having a mixing chamber 11 in its upper portion enclosed by the cylindrical walls 10a and with horizontally and radially extended hot and cold water inlet ports 12 and 13 in its bottom 10b communicating at their inner ends with a circular mixing valve chamber 14 opening at its upper end into mixing chamber 11. The hot and cold inlet ports 12 and 13 are somewhat less than diametrically opposed as shown in Figure 4 and between them a vertically extended outlet port 15 is provided, same extending entirely through the bottom 10b and opening at its upper end into the mixing chamber with a diametrically enlarged annular outlet valve seat 15a. The top of the casing is closed by a cover plate 16 secured by screws 16a and made water-tight by gasket 16b. Centrally said cover plate 16 has a depressed stuffing box or gland socket 17 interiorly threaded at 17a and terminating at its lower or inner end in an inwardly turned lip 17b having a central round opening 17c. A proportioning valve control shaft 18 is journaled in and extends down through this opening 17c to a point adjacent and above the mixing valve chamber 14 and is held in proper position by an annular outwardly turned flange 19 at its upper end riding in an annular depressed seat 19a in the lip 17b around said opening to which said flange is pressed by packing 20 in the gland socket 17. A gland 21 threaded in the chamber 17 holds the packing and shaft 18 to place as shown.

A cylindrical proportioning valve 22 is journaled freely in its chamber 14 and has an upwardly and axially extending stub shaft 23 reduced at its upper end 23a to fit and turn freely in a socket 24 in the lower end of the control shaft 18. This valve 22 has also a lower axially extended stub 25 turning in a socket 25a in the bottom of the valve chamber 14 and in its walls, the valve has two opposed spiral grooves or passages 26 and 27 adapted according to the position of the valve to fully or partly register with the inlet ports 12 and 13 and conduct the water from either or both of these ports up into the mixing chamber 11. Preferably the walls of the valve chamber 14 from the mouths of the ports 12 and 13 upward to the mixing chamber have complemental enlargements 26a and 27a (see Figure 4) designed to register with the grooves 26 and 27 and facilitate the upward flow of water and to make the rotation of the valve free in its socket. The valve 22 carries a radially extended stop arm 28 at its upper end playing between stops 28a on the bottom 11b and so positioned as to limit the rotation of the valve to the point that each groove 26 and 27 may be registered fully with its associated hot and cold inlet ports 12 and 13.

A thermostat 29 in the form of a spiral coil of two laminated strips of metal having unequal coefficients of expansion is provided and the inner end of the coil is anchored to the mixing valve stub shaft 23 by screws 29ª while the outer end is secured by screw 30 to a bracket 31 which is secured by screw 32 to the valve control shaft 18 above the said stub shaft. The thermostat coil thus connects the control shaft 18 to the proportioning valve 22 and the purpose and operation of this arrangement will be hereinafter described.

Preferably, and as illustrated in the drawings, the thermostat coil is disposed in a recess 22ª formed in the upper surface of the proportioning valve 22. This permits the body to be shortened or made more compact, secures a better action on the bearings with less friction and less binding than if the thermostat were disposed above the upper surface of the valve 22ª.

Figure 1:
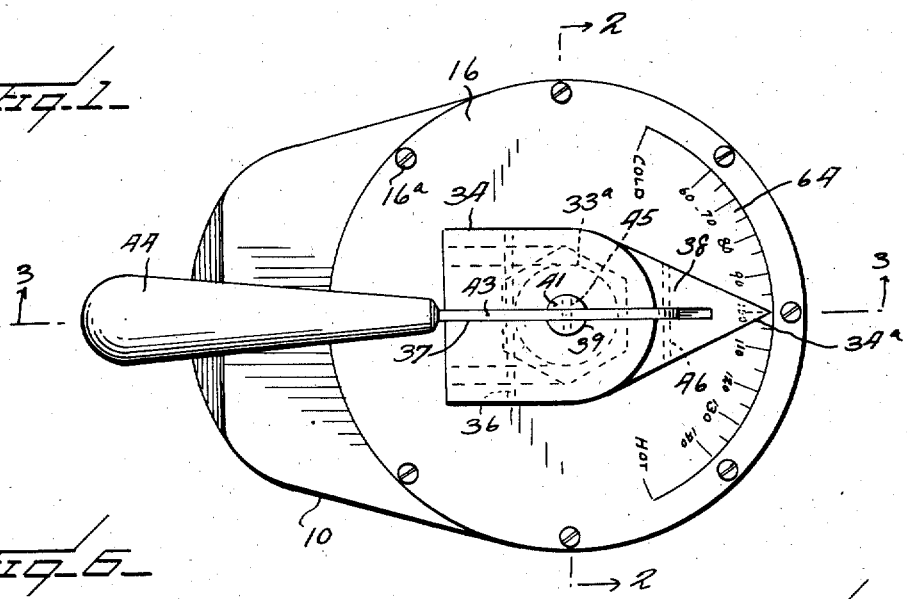
Figure 1 is a plan view of the faucet.

The gland 21 has a diametrically enlarged circular flat head 33 overlying the top of the cover plate 16 and provided with an exterior peripheral groove 33ª. A handle pointer or rotary head section 34 is journaled freely on this head 33 by a tongue 35 extending into said groove and at a diametrically opposed point by a screw 36 threaded horizontally through the pointer and passing tangentially through the said groove as shown in Figure 1. The handle pointer 34 may thus rotate freely on the gland head but will not become detached therefrom and the extended point 34ª may play freely over the face of the cover plate 16. Said pointer at its rear end is depressed or reduced in thickness as at 37 and the pointer forward of this depressed portion is provided with spaced apertured ears 38. Both this rear portion of the pointer and the gland 21 have alined bores 39 and 40 axially alined with the proportioning valve control shaft 18. An outlet valve control rod 41 is slidably and rotatably mounted in and extends down through the bores 39 and 40 and at its upper end is slotted at 4ª to receive the blade 43 of a control handle 44 and pivoted therein by a pin 45. Said blade 43 of this handle is disposed between the aforesaid bearing ears 38 and is pivotally connected thereto by a hinge pin 46 so that the handle may be swung upward at its outer end (Figure 3) to exert an upward pull on the control rod 41 without disturbing or moving the pointer 34. To prevent binding at the connection to the rod 41 the head portion 43 of the handle has a slot 47 receiving the pin 46 and providing the necessary play.

The proportioning valve control shaft 18 has a longitudinally extended recess or groove 48 intermediate its ends and opening out through one side and above this recess has a central bore 49 communicating and registering with the bores 39 and 40 aforesaid. The control rod 41 thus extends down through the packing 20 and through the bore 49 into the recess or groove 48. This bore 49 is preferably square or of other rectilinear shape and that portion 41ª of the rod 41 which plays through this bore is of complementary cross section, the result being that by swinging upward and then rotating the control handle 44, the rod 41 and the control shaft 18 will be rotated within the casing. At the same time the hinge connection between the handle 44 and pointer 34, while permitting the described independent upward swinging movement of the former, will cause the pointer to be rotated with the control rod and shaft.

A valve operating disk or plate 50 is slidingly mounted on the shaft 18 and has a tongue 51 extended freely and slidably into the recess or groove 48 in the shaft 18 where it is secured by brazing or like means to the lower end of the control rod 41 to be raised or lowered thereby, the said plate in the normal or "off" positions of the handle 44 and rod 41 resting at the lower end of the recess 48 as shown in Figure 2. The disk 50 has arcuate wings 52 forming a partly circular flat plate concentric with the shaft 18 and marginally beaded or rolled as shown at 53. These wings are upwardly and outwardly extended as shown in Figure 2.

An ear 54 is extended radially inward from the casing wall 10ª above and directly over the outlet port 15 and has a worm threaded opening 54ª axially aligned with said port. A flat outlet valve 55 is carried by a screw 56 which engages in a diametrically enlarged worm threaded head 57 threaded in the opening 54ª as shown. A gear wheel 58 which may be circular in plan but might be a sector gear is secured on the screw 56, which constitutes a valve stem, some distance below the ear 54 and is sufficiently large to extend outward beyond the gear so as to expose its toothed periphery as shown in Figure 4. The gear 58 is fixed on the screw or stem 56 to rotate therewith and with the head 57.

Mounted on the exterior face of the ear 54 is a valve operating bell crank 59 which is fulcrumed at its elbow at 60 to this ear. One arm 61 of the bell crank extends inward and is forked at 62 to engage over the beaded margin of the disk 50 while the other arm 63 extends angularly downwardly and slightly inwardly and is provided at its lower end with inwardly extending teeth 63ª to mesh with the teeth on the operating gear 58. Now as the handle 44 is raised at its outer end and the control rod 41 thus pulled upward, the resulting rise of the disk 50 will swing the arm 62 of the crank 60 upward and cause the teeth 63ª of the arm 63 to engage with and rotate the operating gear 58. The pitch or lead of the worn threads in the opening 54ª and valve stem shaft end 57 being properly proportioned, this rotation of the gear will elevate the valve stem and raise the valve 55 from its seat, the extent of the opening of the outlet port 15 thus provided being directly controlled by the distance which the handle 44 is raised. The teeth on the arm 63 are made long enough to clear the gear 58 as it is raised by opening the valve 55, the upward movement of the arm itself also contributing to the required clearance. The margin of the disk 50 plays freely through the fork 62 as the shaft 18 is rotated in adjusting the thermostat.

Figure 6:
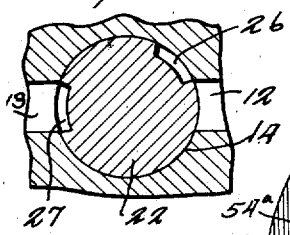
Figures 6, 7 and 8 are similar diagrammatic sectional views of the proportioning valve and inlet ports showing the valve in three positions.
Figure 7:
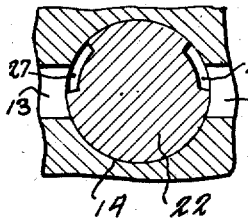
Figure 8:
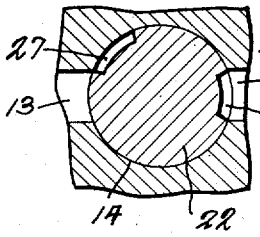

In operation the faucet is connected to the usual hot and cold water supply pipes (not shown) as by the tapped outer ends 12ª and 13ª of the ports 12 and 13 so that the water enters these ports. The cover plate 16 has an indicating scale 64 calibrated in degrees of temperature from cold to hot as shown. The thermostat coil 29 is so constructed as to be expanded or uncoiled by the effect of heat and is so tensioned and adjusted that when the pointer 34 is at "cold" position on the scale 64, the coil in assuming its normal coiled condition will move and hold the valve 22 with the groove 27 in registry with the cold water inlet port 13, as shown in Figure 6, so that cold water flows into the mixing chamber 11. This water may then be dispensed from the faucet through the outlet port 15 by simply raising the handle 44 which opens the valve 55 as has been pointed out hereinbefore. In this position of the valve 22, the other groove 26 is out of registry with the hot water inlet port 12 as shown in Figure 6, the space between the grooves on the valve being such as to permit this. Assuming now that the pointer 34 is moved to say 100° on the scale 64, the resulting rotation of the operating shaft 18 (through the action of the rod 41 in the square bore 49 in the shaft) tends to coil or contract the stiff thermostat coil 29, rotate said coil 29 and causes it to carry the valve 22 around toward the hot water inlet port 12 until the groove 26 registers therewith as shown in Figure 8. Hot water now enters the mixing chamber 11 and covering the coil 29, causes it to uncoil under the heat to which it is subjected, and move the valve 22 back toward the cold water port 13 until both ports 12 and 13 are partially opened as shown in Figure 7, that is, opened to the proper degree to permit the proper proportioning of the hot and cold water as to secure the result desired. The water then entering the mixing chamber and flowing from the passage 15 when the valve 55 is opened is at the temperature indicated by the pointer 34. As the pointer is moved further around the scale toward the hot position, it will require an increasingly greater proportion of hot water in the mixing chamber in order to uncoil the thermostat sufficiently to shift the valve until at full "hot" position, the hot water port 12 is opened. This position of the pointer 34 through the resultant rotation of the shaft 18 thus controls the position and condition of the thermostat coil and that coil then automatically regulates the position of the proportioning valve so that the hot and cold water is proportioned to secure the temperature indicated on the scale 64 as will be understood. Of course, the handle 44 must be raised to dispense the water from the faucet for proper mixing of the water and operation of the temperature controlling means.

It is thought that further details of the operation of the faucet will be evident without further description herein. The convenience and utility of the faucet with its single handle controlling both the water temperature and flow is also apparent. While described herein as applied to use as a water faucet, the valve may be used as well as a control for many other liquids or fluids of differing temperatures.

While I have herein set forth a certain preferred embodiment of my invention, it is understood that I may vary from the same in minor details so as best to construct a practical device for the purposes intended, not departing from the spirit of the invention and within the scope of the appended claims.

I claim:

1. In a device of the kind described, a casing having a mixing chamber and having hot and cold water inlet ports and a common outlet port, a rotary proportioning valve for controlling the flow of water to the mixing chamber, an outlet valve for controlling the flow of water from the mixing chamber through the outlet port, a thermostat coil exposed to water in the mixing chamber and connected at one end to the mixing valve, a shaft journaled in the casing and connected to the other end of the thermostat coil, a rotary pointer on the casing connected to the shaft, a handle pivotally connected to the pointer, a rod slidably mounted in the casing and connected to the handle at one end, a disk on the other end of the rod, and a bell crank lever fulcrumed in the casing and operatively connected at one end to the outlet valve and to the disk at its other end.

2. In a device of the character described, a casing having a hot water inlet port and a cold water inlet port, disposed in opposed relation, a cylindrical proportioning valve disposed between the two ports and having two spirally disposed opposed grooves in its face adapted to register with the corresponding ports, a rotation of the proportioning valve controlling the flow of water from said ports, a thermostat coil connected at one end to the rotatable proportioning valve and exposed to the water flowing through the casing, a shaft connected to the other end of the thermostat coil, manually operable means for rotating said shaft to thereby adjust the coil and the proportioning valve to different positions, the casing having an outlet port, and a manually operable valve operatively connected to the shaft rotating means for controlling passage through the outlet port.

3. In a device of the character described, a casing having a mixing chamber and having a pair of inlet ports and an outlet port, manually shiftable means for controlling the proportionate flow from the inlet ports into the mixing chamber, an outlet valve controlling the outlet port and having a valve stem provided with a sharp pitched threaded head, the chamber having an ear and extending out therefrom threaded to receive the threads on said head, the valve stem carrying a toothed element operatively connected to the head to rotate it, a bell crank lever having one arm formed with teeth engaging the toothed member to rotate it as the bell crank lever is oscillated, the manually operable means being operatively connected to the bell crank to shift the bell crank independently of the proportioning action of said means.

4. A faucet, including a casing formed to provide a mixing chamber in one end thereof, the opposite end of the casing having a hot water inlet and a cold water inlet, a rotatable proportioning valve disposed within the casing and controlling the relative amount of hot and cold water admitted to the mixing chamber, the valve being recessed and the recess opening into the mixing chamber, a thermostatic coil disposed in said recess and connected at one end to the valve, an outlet for the mixing chamber outward of the proportioning valve, a valve for said outlet, manually operable means having rotative and axial movement and operatively connected to the thermostatic coil to thereby control the proportioning valve as the manually operable means is rotated, and means operatively connecting the outlet valve to the manually operable means to shift the outlet valve toward or from its seat upon an axial movement of the manually operable means without operating the proportioning valve.

5. A faucet, including a casing having a hot water inlet and a cold water inlet, a mixing chamber in said casing, a rotatable proportioning valve disposed within the casing and controlling the relative amount of hot and cold water admitted to the mixing chamber, a thermostatic coil in said mixing chamber and connected at one end with said valve, a valve-seat outlet for the mixing chamber radially outwardly of said valve, a valve for said outlet, manually operable means having rotative and axial movement and operatively connected to the thermostatic coil to thereby control the proportioning valve as the manually operative means is rotated, and means operatively connecting the outlet valve to the manually operable means to shift the outlet valve toward or from its seat upon an axial movement of the manually operable means without operating the proportioning valve.

6. A faucet device, including a mixing chamber, a proportioning valve operable to vary the admission of different-temperature fluids into said chamber, an outlet valve operable to control the volumetric discharge of fluid from said chamber, means adapted to operate the proportioning valve in response to temperature variations of fluid in said chamber, a common control member extending into said chamber, the control member being rotatably and axially movable, means controlling the operation of said proportioning valve and including a member relatively movable with respect to said common control member axially thereof but constrained to rotate therewith, and control means for said outlet valve including wedge means movable to advance and retain the valve in the closer position and a member constrained to move axially with said common control member for imparting such movement to said wedge means, the common control member being freely rotatable relative to said constrained member while said outlet valve is retained in the closed position.

7. A faucet device, including a mixing chamber, a proportioning valve operable to vary the admission of different-temperature fluids into said chamber, a discharge valve operable to control the volumetric discharge of fluid from said chamber, means adapted to operate the proportioning valve in response to temperature variations of fluid in said chamber, a common control member having a portion thereof projected into said chamber, said control member being both rotatably and axially movable, means within said chamber in control of said proportioning valve and including a member associated with the inwardly projecting portion of said common control member and having free axial movement with respect thereto but being constrained to rotate therewith, and means within said chamber controlling the discharge valve and including a pivoted element disposed between said projected end section of the controlling member and said discharge valve, one end of said pivoted element being constructed and arranged to permit rotative movement of said end portion of the controlling member with relation thereto but being constrained to move axially therewith and thereby operating to shift said discharge valve.

8. A faucet device, comprising a mixing chamber, a proportioning valve operable to vary the admission of different-temperature fluids into said chamber, a discharge valve controlling the volumetric discharge of fluid from said chamber and including wedge means in association therewith for forcibly holding such discharge valve in its closed position, means adapted to operate the proportioning valve in response to temperature variations of fluid in said chamber, a common control member extending from the exterior of the chamber into the interior thereof and movable in two planes, coupling means within the chamber between the inner portion of said common control member and said proportioning valve and operating said proportioning valve upon a certain manipulation of the common control member, and a second coupling means within the chamber operatively connected to the discharge valve and to the common control member, said second coupling means operating the wedge means to operate the discharge valve upon a different manipulation of the common control member, the last-named coupling means being constructed and arranged to permit operation of the proportioning valve without movement of the discharge valve irrespective of whether said discharge valve is opened or closed.

9. A faucet device, comprising a mixing chamber, a proportioning valve operable to vary the admission of different-temperature fluids into said chamber, a discharge valve controlling the volumetric discharge of fluid from said chamber and including a screw threaded means for forcibly shifting such discharge valve toward or from its closed position, means adapted to operate the proportioning valve in response to temperature variations of fluid in said chamber, a common manually operable control member extending from the exterior of the chamber into the interior thereof and movable rotatably and axially, coupling means within the chamber between the inner portion of said control member and said proportioning valve and operating said proportioning valve upon a rotation of the control member, and a second coupling means within the chamber operatively connected to the screw threaded means and to the common control member and operating the discharge valve upon an axial movement of the common control member, the last-named coupling means being constructed and arranged to permit operation of the proportioning valve without movement of the discharge valve and irrespective of whether said discharge valve is opened or closed.

LEROY N. HERMANN.